US008504909B2

(12) United States Patent
Yuan et al.

(10) Patent No.: US 8,504,909 B2
(45) Date of Patent: Aug. 6, 2013

(54) LOAD-TIME MEMORY OPTIMIZATION

(75) Inventors: Feng Yuan, Bellevue, WA (US);
Arindam Basak, Redmond, WA (US);
Ahmet Gurcan, Mercer Island, WA (US); Matthew E Loar, Seattle, WA (US); Jesse D. McGatha, Sammamish, WA (US); Justin A. Slone, Seattle, WA (US); Jerry J. Dunietz, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1061 days.

(21) Appl. No.: 12/098,401

(22) Filed: Apr. 4, 2008

(65) Prior Publication Data

US 2009/0254808 A1    Oct. 8, 2009

(51) Int. Cl.
*G06F 17/27*    (2006.01)
(52) U.S. Cl.
USPC ........................................ 715/234
(58) Field of Classification Search
USPC ........................................ 715/234
See application file for complete search history.

(56) References Cited

U.S. PATENT DOCUMENTS

| 6,441,919 | B1 |   | 8/2002 | Parker et al. |
| 6,718,516 | B1 | * | 4/2004 | Claussen et al. ............... 715/234 |
| 7,072,934 | B2 |   | 7/2006 | Helgeson et al. |
| 7,073,123 | B2 |   | 7/2006 | Friedman et al. |
| 7,237,194 | B2 | * | 6/2007 | Grambihler et al. .......... 715/239 |
| 7,512,878 | B2 | * | 3/2009 | Shur et al. ...................... 715/234 |
| 7,823,063 | B2 | * | 10/2010 | Ramani et al. ................ 715/239 |
| 2003/0084401 | A1 | * | 5/2003 | Abel et al. ................. 715/501.1 |
| 2004/0133854 | A1 |   | 7/2004 | Black |
| 2005/0050086 | A1 | * | 3/2005 | Liu et al. ........................ 707/102 |
| 2005/0125728 | A1 |   | 6/2005 | Peiro et al. |
| 2007/0016897 | A1 |   | 1/2007 | Todd |
| 2007/0047816 | A1 | * | 3/2007 | Graham et al. ............... 382/181 |
| 2007/0125860 | A1 |   | 6/2007 | Lapstun et al. |
| 2007/0136659 | A1 |   | 6/2007 | Adelberg et al. |
| 2007/0256048 | A1 | * | 11/2007 | Relyea et al. ................. 717/100 |
| 2007/0277094 | A1 |   | 11/2007 | Majidian |
| 2008/0178067 | A1 | * | 7/2008 | Lahman et al. ............... 715/200 |

FOREIGN PATENT DOCUMENTS

| JP | 2001209641 A | * | 8/2001 |
| WO | WO2005043327 A2 |   | 5/2005 |

OTHER PUBLICATIONS

"International Search Report", Filed date Mar. 4, 2009, Application No. PCT/US2009/036067, pp. 1-11.
"Maximum Performance from XPS Documents", Oct. 2, 2007, Microsoft Corporation, pp. 12.
Yuan, "Optimize XPS markup", retrieved at <<http://blogs.msdn.com/fyuan/archive/2006/01/18/514450.aspx>>, Jan. 18, 2006, pp. 2.

* cited by examiner

*Primary Examiner* — Laurie Ries
*Assistant Examiner* — Tionna Smith
(74) *Attorney, Agent, or Firm* — Wolfe-SBMC

(57) ABSTRACT

Various embodiments can be used to process packages or documents that contain markup language describing one or more documents. Markup language descriptions can be processed to identify certain objects that reoccur or are repeated in the markup language description. If a re-occurring or repeating object is encountered in the markup language description, a resource dictionary can be used to catalog such objects and, an associated object model can include, from the resource dictionary, references to a re-occurring or repeating object. By using the resource dictionary as such, memory resources can be conserved when an in-memory representation of the object model is built.

12 Claims, 5 Drawing Sheets

LOAD-TIME MEMORY OPTIMIZATION

BACKGROUND

Electronic documents can sometimes be represented using markup language such as XML. In some scenarios, the markup language representation can be used to build an object model that can then be used by a consuming device to consume or otherwise access a document. Often times in complex markup language representations, objects associated with a document are repeated in the object model. Repeating objects in an associated object model can constitute an inefficient use of memory resources. This is because some objects may be quite large in size.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments can be used to process packages or documents that contain markup language describing one or more documents. Markup language descriptions can be processed to identify certain objects that reoccur or are repeated in the markup language description. If a re-occurring or repeating object is encountered in the markup language description, a resource dictionary can be used to catalog such objects and, an associated object model can include, from the resource dictionary, references to a re-occurring or repeating object. By using the resource dictionary as such, memory resources can be conserved when an in-memory representation of the object model is built.

BRIEF DESCRIPTION OF THE DRAWINGS

The same numbers are used throughout the drawings to reference like features.

DETAILED DESCRIPTION

Overview

Various embodiments can be used to process packages or documents that contain markup language describing one or more documents. Markup language descriptions can be processed to identify certain objects that reoccur or are repeated in the markup language description. If a re-occurring or repeating object is encountered in the markup language description, a resource dictionary can be used to catalog such objects and, an associated object model can include, from the resource dictionary, references to a re-occurring or repeating object. By using the resource dictionary as such, memory resources can be conserved when an in-memory representation of the object model is built.

In the discussion that follows, a section entitled "Operating Environment" describes but one operating environment that can be utilized to practice the inventive principles described herein in accordance with one or more embodiments. Following this, a section entitled "Load Time Optimizer-Example" is provided and describes an example load time optimizer in accordance with one or more embodiments. Following this, a section entitled "Implementation Example" describes an example implementation in which the inventive techniques can be employed in accordance with one or more embodiments. Following this, a section entitled "Objects of Interest in Load Time Optimization" describes some example objects that can be utilized by the inventive techniques in accordance with one or more embodiments. Last, a section entitled "Example System" describes an example system that can be utilized to implement one or more embodiments.

Operating Environment

Figure 1:
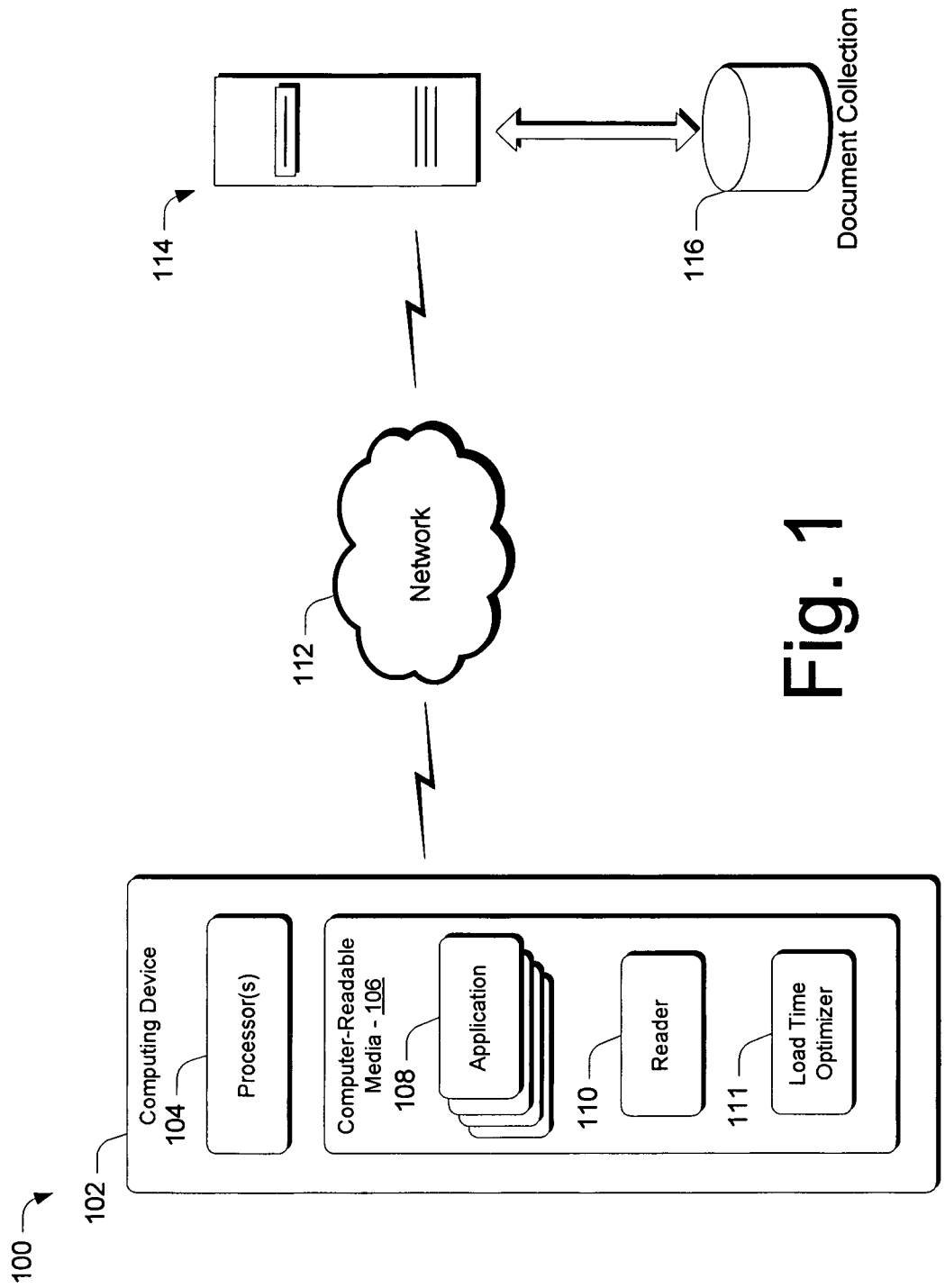
FIG. 1 illustrates an operating environment in accordance with one or more embodiments.

FIG. 1 illustrates an operating environment in accordance with one or more embodiments, generally at 100. Operating environment 100 includes a computing device 102 having one or more processors 104, one or more computer-readable media 106 and one or more applications 108 that reside on the computer-readable media and which are executable by the processor(s). The computer-readable media can include, by way of example and not limitation, all forms of volatile and non-volatile memory and/or storage media that are typically associated with a computing device. Such media can include ROM, RAM, flash memory, hard disk, removable media and the like. In addition, computing device 102 includes an application in the form of a reader 110. In the illustrated and described embodiment, reader 110 is configured to enable a user to access and consume various documents. The documents can be in any suitable format. In at least some embodiments, the reader is configured to enable a user to access and consume documents that conform to the XML Paper Specification (XPS) Version 1.0. The XML Paper Specification describes XPS documents and how they are organized internally and rendered externally. The XML Paper Specification builds on the Open Packaging Conventions. The XML Paper Specification describes how producers can create document files in the XPS document format, and how consumers can access, render, or process the contents of an XPS document. An XPS document, as described below in more detail, comprises a paginated set of related pages. The pages have a fixed layout, are organized into one or more fixed documents, and stored according to the Open Packaging Conventions. A consumer of an XPS document would typically use a reader such as reader 110 to access and consume an XPS document.

Further, computing device 102 includes a load time optimizer 111 that is used to build, in a more optimal way, an in-memory representation of an object model associated with a document or package containing multiple documents. Specifically, in at least some embodiments, the load time optimizer is used to detect objects that reoccur relative to a particular document or package, and represent reoccuring objects in a resource dictionary. References to reoccuring objects that are contained in the resource dictionary are then used in the object model in place of an associated object, so that reoccuring objects do not have to be created multiple times in the object model. Doing so saves memory resources, particularly in cases where a reoccuring object would utilize large amounts of memory. Functionality of the load of time optimizer is described in more detail below.

In addition, environment 100 includes a network 112, such as a local network or the Internet, via which documents can be received. Documents can be received from any suitable source. For example, in at least some embodiments, documents can be received over network 112 by way of a server 114 that has access to a document collection such as document collection 116. In at least some instances, documents can be streamed to computing device 102 using any suitable streaming format. In at least some embodiments, one or more documents can be packaged in a package that is compliant with the XPS specification, an example of which is provided below.

Computing device 102 can be embodied as any suitable computing device such as, by way of example and not limitation, a desktop computer, a portable computer, a handheld computer such as a personal digital assistant (PDA), cell phone, and the like. One example of a computing device is shown and described below in relation to FIG. 5.

Having discussed the general notion of an example operating environment in which various embodiments can operate, consider now a discussion of a load time optimizer in accordance with one or more embodiments.

Load Time Optimizer—Example

Figure 2:
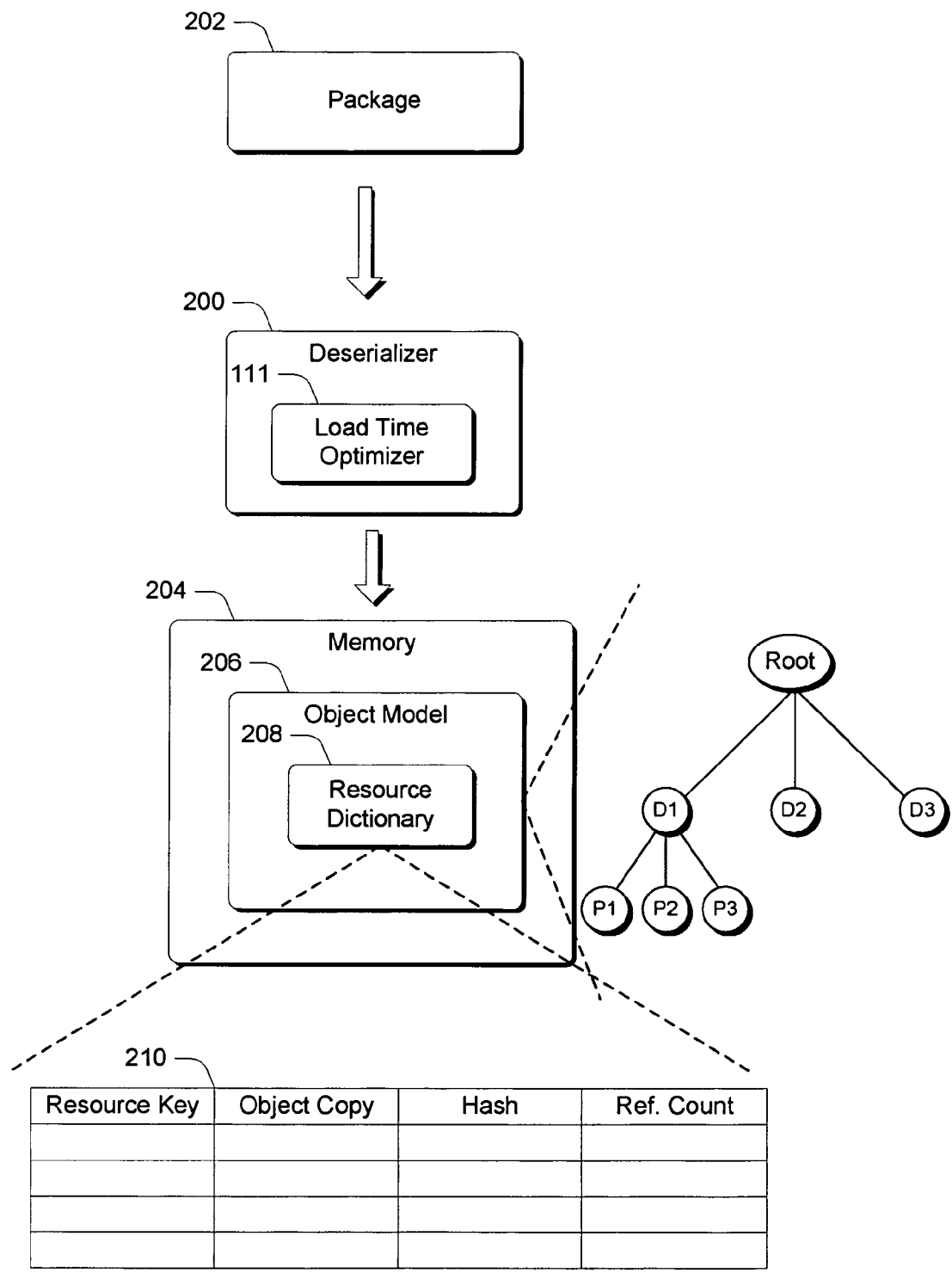
FIG. 2 illustrates an example of a load time optimizer 111 in accordance with one or more embodiments.

FIG. 2 illustrates an example of a load time optimizer 111 in accordance with one or more embodiments. In one or more embodiments, the load time optimizer 111 is implemented in software and can comprise part of or otherwise be used by a deserializer 200 that is configured to process a package 202 that contains a description of one or more documents. The documents can be described in a hierarchical tag-based markup language such as XML or, in at least some embodiments, XAML. The markup language describes the document or package and its constituent parts. One example of this is provided below in the section entitled "Implementation Example".

In this example, as deserializer 200 receives a document or package, it parses the document or package description and builds in memory 204 an object model 206. In the present example, object model 206 includes a root node and multiple direct children nodes each of which can represent a different document, e.g., documents D1, D2, and D3. In turn, each of the documents can have multiple different pages such as, document D1's page 1 (P1), page 2 (P2), and page 3 (P3). Each page can have one or more resources associated with it. Examples of resources include, by way of example and not limitation, text, fonts, images and the like.

During the deserialization process, load time optimizer 111 attempts to detect multiple instances of certain objects appearing in the markup. When multiple instances of certain objects are found in the markup, the load time optimizer 111 represents those instances by an entry in resource dictionary 208. In those situations where multiple instances of certain objects are found, a reference is inserted into object model 206, rather than creating individual instances of the same object.

In operation, in at least some embodiments, resource dictionary 208 includes a table 210 with entries that correspond to reoccurring objects. In this particular example, table 210 includes entries for a resource key (such as a Globally Unique ID or "GUID"), a copy of the object, a hash associated with the object, and a reference count. The copy of the object can, in at least some embodiments, be a pointer to the object.

As portions of a document are being processed by deserializer 200, load time optimizer 111 looks for certain objects in the markup. When it finds an object for which it is looking, it attempts to find that object in the resource dictionary 208. To do this, the load time optimizer computes a hash of the object based upon one or more of the object's attributes. Then, based on a hash, a full comparison of the object with objects in table 210 with matching hashes is performed. If a matching object is found in table 210, the load time optimizer 111 or deserializer 200 takes an associated resource key that has been allocated for the object and sets that resource key in the object model where the associated object would have appeared. In addition, the reference count for a found object is incremented by one. If, on the other hand, the computed hash of the object does not match a hash in the resource dictionary 208, a new resource key is generated and set in table 210 and the reference count for that object is initialized to one. In addition, the new resource key is set in the object model where the associated object would have appeared.

Once the portion of the document that has been processed by deserializer 200 has been processed in this regard, the resource dictionary 208 is reviewed to identify objects that have been repeated. This is done by examining the reference count field in table 210. If the reference count indicates that an object has been used one time, the object's entry in the table (corresponding to a table row) is removed and the associated object is created in the object model in place of the associated resource key. The reason for this is that single occurrences as indicated by the reference count indicate that an object is not reoccurring.

Hence, in the above-described embodiment, a first pass is made in which reoccurring objects (as well as other objects that are not reoccurring) are cataloged in the resource dictionary 208. A second pass is made of the resource dictionary and entries associated with non-reoccurring objects are removed from the resource dictionary.

At this point in the processing, an object model has been built that more optimally represents an associated document. The more optimally represented object model can be more easily consumed or loaded by client applications such as a reader application. In addition, in at least some embodiments, a serialization feature can be used to process the object model and write out a more optimal representation of a document's markup. In this example, the more optimal representation of a document's markup can include a resource dictionary inside of the markup. Using this more optimal markup representation, subsequently-loaded documents can be represented by a corresponding more optimal object model.

Figure 3:
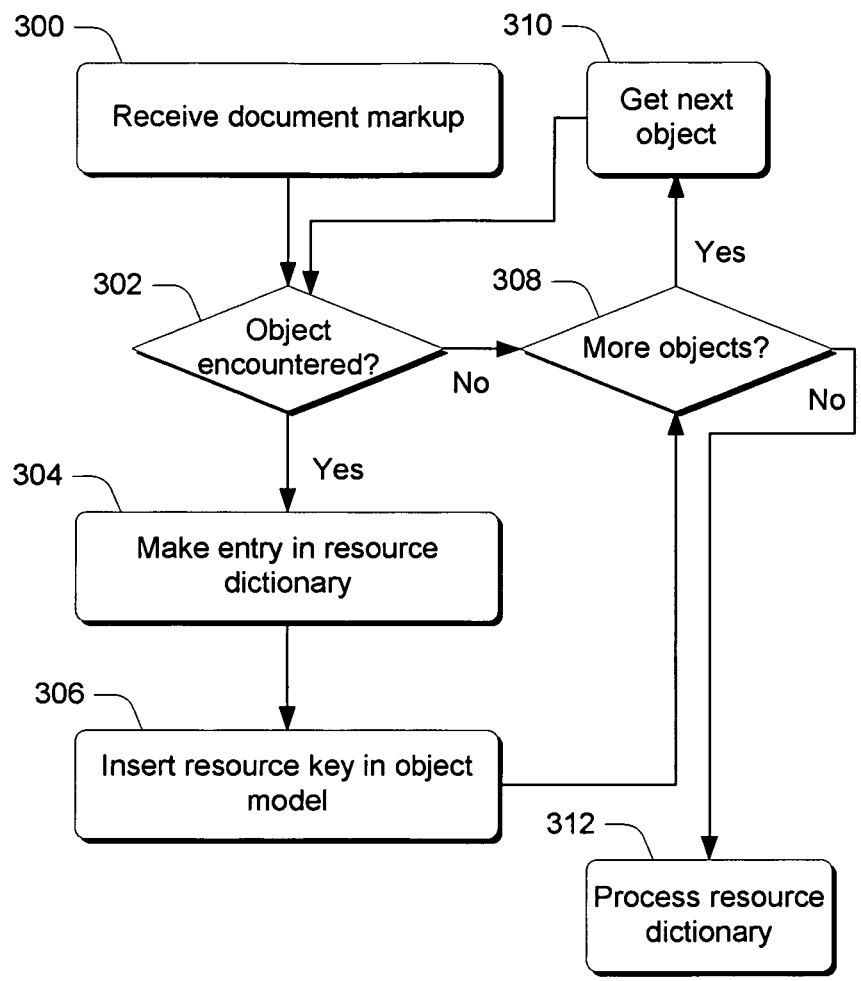
FIG. 3 is a flow diagram that describes a method in accordance with one or more embodiments.

FIG. 3 is a flow diagram that describes steps in a method in accordance with one or more embodiments. The method can be performed in connection with any suitable hardware, software, firmware, or combination thereof. In at least some embodiments, the method can be performed by a suitably-configured load time optimizer 111, such as the one described above.

Step 300 receives document markup associated with a document and begins processing the document markup to identify whether certain objects are repeated. Any suitable objects can be the subject of this processing, examples of which are provided below in a section entitled "Objects of Interest in Load Time Optimization". Step 302 ascertains whether an object of interest is encountered in the document markup. If an object of interest is encountered, step 304 makes an entry in a resource dictionary. Examples of how this can be done are provided above. Step 306 inserts a resource key associated with the object of interest in an object model associated with the document and returns to step 308 which ascertains whether there are any additional objects to process. If there are additional objects to process, step 310 gets the next object and returns to step 302. If, on the other hand, there are no more additional objects to process, step 312 processes the resource dictionary as described below in relation to FIG. 4.

If, on the other hand, step 302 ascertains that an encountered object is not an object of interest, step 308 ascertains whether there are any additional objects to process. If there are additional object to process, step 310 gets the next object and returns to step 302. If there are no additional object process, step 312 processes the resource dictionary as described below in relation to FIG. 4.

Figure 4:
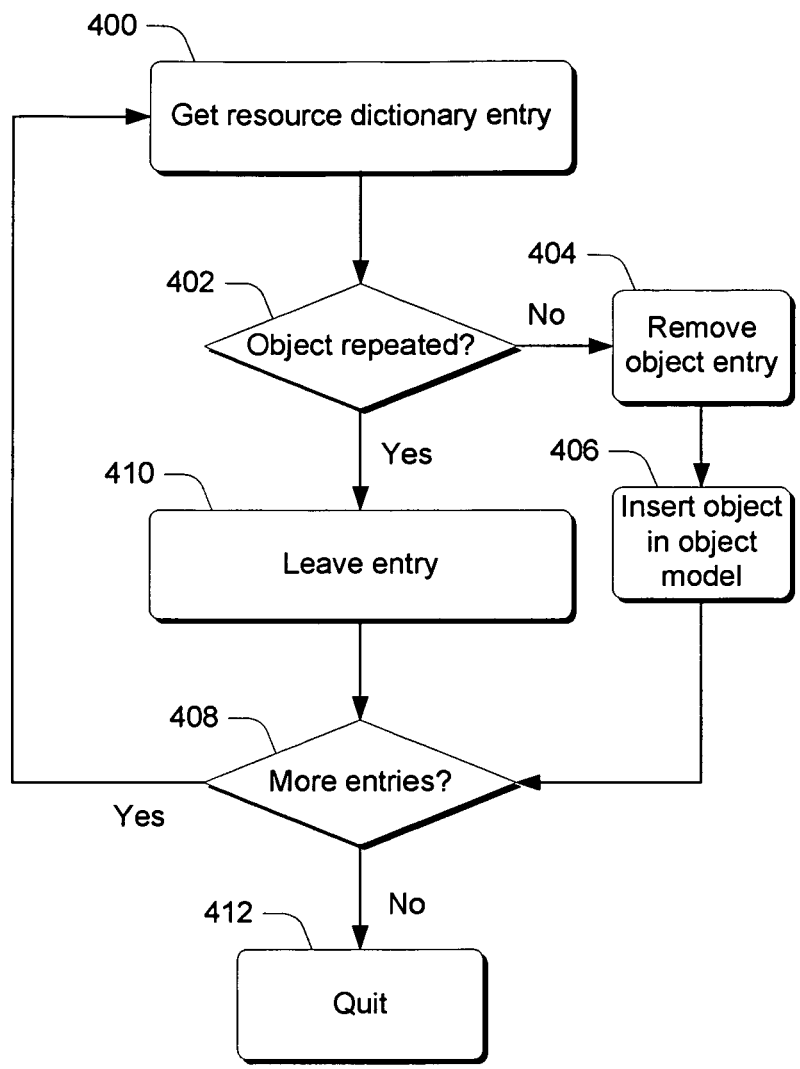
FIG. 4 is a flow diagram that describes a method in accordance with one or more embodiments.

FIG. 4 is a flow diagram that describes steps in a resource dictionary processing method in accordance with one or more embodiments. The method can be performed in connection with any suitable hardware, software, firmware, or combination thereof. In at least some embodiments, the method can be performed by a suitably-configured load time optimizer 111, such as the one described above.

Step 400 gets a resource dictionary entry and step 402 ascertains whether the resource dictionary entry corresponds with a repeated object. This step can be performed in any suitable way. For example, in at least some embodiments, this step can be performed by examining a reference count associated with the entry. If the object is not a repeated object, step 404 removes the resource dictionary entry associated with the object and step 406 inserts the object in the object model. Step 408 ascertains whether there are more entries in the resource dictionary and, if so, returns to step 400 using the next resource dictionary entry. If there are no additional entries in the resource dictionary, step 412 quits.

If, on the other hand, step 402 ascertains that an object is repeated, step 410 leaves the entry in the resource dictionary and step 408 ascertains whether there are more entries in the resource dictionary. If so, the method returns to step 400. If there are no additional entries in the resource dictionary, step 412 quits.

In this way, a first pass is made in which reoccurring or repeated objects (as well as other objects that are not reoccurring) are cataloged in the resource dictionary 208 (FIG. 3). A second pass is made of the resource dictionary and entries associated with non-reoccurring objects are removed from the resource dictionary (FIG. 4).

Having now considered a load time optimizer example, consider now an implementation example in which the principles described above can be implemented.

Implementation Example

The context of the example described just below is one in which a document package has been built to be compliant with the XML Paper Specification (XPS) Version 1. It is to be appreciated and understood that the various embodiments described in this document can be employed in connection with other standards that are different from the XPS standard without departing from the spirit and scope of the claimed subject matter. In addition, the various embodiments can be employed in connection with subsequent versions of the XPS Specification.

As a brief overview of the XPS standard, consider the following.

This XML Paper Specification, or XPS, describes the set of conventions for the use of XML and other widely available technologies to describe the content and appearance of paginated documents. It is written for developers who are building systems that process XPS content.

The XML Paper Specification describes a set of conventions for the use of XML and other widely available technologies to describe the content and appearance of paginated documents. It is written for developers who are building systems that process XPS content. One goal of XPS is to ensure the interoperability of independently created software and hardware systems that produce or consume XPS content. The XPS specification defines the formal requirements that producers and consumers satisfy in order to achieve interoperability.

The XPS specification describes a paginated-document format called the XPS Document. The format requirements are an extension of the packaging requirements described in the Open Packaging Conventions specification. That specification describes packaging and physical format conventions for the use of XML, Unicode, ZIP, and other technologies and specifications to organize the content and resources that make up any document.

The XPS Document format represents a set of related pages with a fixed layout, which are organized as one or more documents, in the traditional meaning of the word. A file that implements this format includes everything that is used to fully render those documents on a display device or physical medium (for example, paper). This includes all resources such as fonts and images that might be used to render individual page markings.

In addition, the format includes optional components that build on the minimal set of components that are used to render a set of pages. This includes the ability to specify print job control instructions, to organize the minimal page markings into larger semantic blocks such as paragraphs, and to physically rearrange the contents of the format for easy consumption in a streaming manner, among others.

The XPS Document format uses a ZIP archive for its physical model. The Open Packaging Conventions specification describes a packaging model, that is, how the package is represented internally with parts and relationships. The XPS Document format includes a well-defined set of parts and relationships, each fulfilling a particular purpose in the document. The format also extends the package features, including digital signatures, thumbnails, and interleaving.

The packaging conventions described in the Open Packaging Conventions specification can be used to carry any payload. A payload is a complete collection of interdependent parts and relationships within a package. The XPS specification defines a particular payload that contains a static or "fixed-layout" representation of paginated content: the fixed payload.

A package that holds at least one fixed payload and follows the rules described in the XPS specification is referred to as an XPS Document. Producers and consumers of XPS Documents can implement their own parsers and rendering engines based on this specification.

XPS Documents address the requirements that information workers have for distributing, archiving, rendering, and processing documents. Using known rendering rules, XPS Documents can be unambiguously reproduced or printed without tying client devices or applications to specific operating systems or service libraries. Because the XPS Document is expressed in a neutral, application-independent way, the content can be viewed and printed without the application used to create the package.

A payload that has a FixedDocumentSequence root part is known as a fixed payload. A fixed payload root is a FixedDocumentSequence part that references FixedDocument parts that, in turn, reference FixedPage parts. There can be more than one fixed payload in an XPS Document.

A specific relationship type is defined to identify the root of a fixed payload within an XPS Document: the XPS Document StartPart relationship. The primary fixed payload root is the FixedDocumentSequence part that is referenced by the XPS Document StartPart relationship. Consumers such as viewers or printers use the XPS Document StartPart relationship to find the primary fixed payload in a package. The XPS Document StartPart relationship points to the FixedDocumentSequence part that identifies the root of the fixed payload.

The payload includes the full set of parts used to process the FixedDocumentSequence part. All content to be rendered is contained in the XPS Document. The parts that can be found in an XPS Document are listed the table just below, some of which are described in more detail below the table.

| Name | Description | Required/Optional |
| --- | --- | --- |
| FixedDocumentSequence | Specifies a sequence of fixed documents. | REQUIRED |
| FixedDocument | Specifies a sequence of fixed pages. | REQUIRED |
| FixedPage | Contains the description of the contents of a page. | REQUIRED |
| Font | Contains an OpenType or TrueType font. | REQUIRED if a <Glyphs> element is present |
| JPEG image PNG image TIFF image Windows Media Photo image | References an image file. | REQUIRED if an <ImageBrush> element is present |
| Remote resource dictionary | Contains a resource dictionary for use by fixed page markup. | REQUIRED if a key it defines is referenced |
| Thumbnail | Contains a small JPEG or PNG image that represents the contents of the page or package. | OPTIONAL |
| PrintTicket | Provides settings to be used when printing the package. | OPTIONAL |
| ICC profile | Contains an ICC Version 2 color profile optionally containing an embedded Windows Color System (WCS) color profile. | OPTIONAL |
| DocumentStructure | Contains the document outline and document contents (story definitions) for the XPS Document. | OPTIONAL |
| StoryFragments | Contains document content structure for a fixed page. | OPTIONAL |
| SignatureDefinitions | Contains a list of digital signature spots and signature requirements. | OPTIONAL |
| DiscardControl | Contains a list of resources that are safe for consumers to discard during processing. | OPTIONAL |

FixedDocumentSequence Part

The FixedDocumentSequence part assembles a set of fixed documents within the fixed payload. For example, a printing client can assemble two separate documents, a two-page cover memo and a twenty-page report (both are FixedDocument parts), into a single package to send to the printer.

The FixedDocumentSequence part is the only valid root of a fixed payload. Even if an XPS Document contains only a single fixed document, the FixedDocumentSequence part is still used. One FixedDocumentSequence part per fixed payload is used.

Fixed document sequence markup specifies each fixed document in the fixed payload in sequence, using <DocumentReference> elements. The order of <DocumentReference> elements determines document order and is preserved by editing consumers. Each <DocumentReference> element should reference a FixedDocument part by relative URI.

FixedDocument Part

The FixedDocument part is a common, easily indexed root for all pages within the document. A fixed document identifies the set of fixed pages for the document. The markup in the FixedDocument part specifies the pages of a document in sequence using <PageContent> elements. The order of <PageContent> elements determines page order and is preserved by editing consumers. Each <PageContent> element should reference a FixedPage part by relative URI.

FixedPage Part

The FixedPage part contains all of the visual elements to be rendered on a page. Each page has a fixed size and orientation. The layout of the visual elements on a page is determined by the fixed page markup. This applies to both graphics and text, which is represented with precise typographic placement. The contents of a page are described using a powerful but simple set of visual primitives.

Each FixedPage part specifies the contents of a page within a <FixedPage> element using <Path> and <Glyphs> elements (using various brush elements) and the <Canvas> grouping element. The <ImageBrush> and <Glyphs> elements (or their child or descendant elements) can reference Image parts or Font parts by URI. They should reference these parts by relative URI.

Image Parts

Image parts reference image files. A single image may be shared among multiple fixed pages in one or more fixed documents. Images referenced in markup are internal to the package. References to images that are external to the package are invalid.

Images are included in XPS Documents with an <ImageBrush> element and an ImageSource attribute to reference a part with the appropriate content type. XPS Documents support the following image formats: JPEG, PNG, TIFF, and Windows Media Photo.

Thumbnail Parts

Thumbnails are small images that represent the contents of a fixed page or an entire XPS Document. Thumbnails enable users of viewing applications to select a page easily. Thumbnail images may be attached using a relationship to the FixedPage parts. Each FixedPage part does not have more than one thumbnail part attached.

Although the Open Packaging Conventions specification allows thumbnails to be attached to any part, XPS Document consumers should process thumbnails associated via a package relationship from the package as a whole or via a relationship from a FixedPage part. These thumbnails are either in JPEG or PNG format. Thumbnails attached to any other part should be ignored by XPS Document consumers.

Font Parts

Fonts are stored in font parts. XPS Documents support the OpenType font format, which includes TrueType and CFF fonts. To support portability, Unicode-encoded fonts should be used.

Font parts are referenced using the FontUri attribute of the <Glyphs> element. A single font may be shared among multiple fixed pages in one or more fixed documents. Font references are internal to the package, thus, external references to fonts are invalid.

If the referenced font part is a TrueType Collection, the fragment portion of the URI indicates the font face to be used. The use of URI fragments is specified in the BNF of Generic URI Syntax specification. The fragment contained in the FontURI attribute value is an integer between 0 and n−1 inclusive, where n is the number of font faces contained in the TrueType Collection. For example, to reference the first font face in the font part " . . . /Resources/Fonts/CJKSuper.ttc", the value of the FontUri attribute is " . . . /Resources/Fonts/CJKSuper.ttc#0". If no fragment is specified, the first font face is used in the same way as if the URI had specified "#0".

Remote Resource Dictionary Parts

A remote resource dictionary allows producers to define resources that can be reused across many pages, such as a brush. This is stored in a Remote Resource Dictionary part.

PrintTicket Parts

PrintTicket parts provide user intent and device configuration information to printing consumers. PrintTicket parts are processed when the XPS Document is printed. PrintTicket parts can be attached only to FixedDocumentSequence, FixedDocument and FixedPage parts and each of these parts attaches no more than one PrintTicket. PrintTickets can provide override settings to be used when printing the part to which they are attached.

SignatureDefinitions Part

Producers may add digital signature requests and instructions to an XPS Document in the form of signature definitions. A producer may sign against an existing signature definition to provide additional signature information. A recipient of the document may also sign the XPS Document against a signature definition—this is referred to as "co-signing." Digital signature definitions are stored in a SignatureDefinitions part. A FixedDocument part refers to a SignatureDefinitions part using a relationship of the SignatureDefinitions type.

DocumentStructure Part

Explicitly authored document structure information is stored in the DocumentStructure part. This part contains the document outline and defines the framework for every element in fixed pages in terms of semantic blocks called stories. Stories are split into StoryFragments parts, which contain content structure markup that defines semantic blocks such as paragraphs and tables.

Document structure markup contains a root <DocumentStructure> element. The <DocumentStructure> element uses a Document Structure namespace.

The DocumentStructure part is referenced by relationship from the FixedDocument part. Consumers may provide an algorithmic construction of the structure of an XPS Document based on a page-layout analysis, but they cannot use such a method to derive structure for any part of the XPS Document included in the DocumentStructure part. For example, a consumer capable of calculating reading order from the layout of the document uses the reading order specified in the DocumentStructure part, even though the derived order may be perceived as preferable to the specified order.

StoryFragments Part

The StoryFragments part contains content structure markup (for example, for tables and paragraphs) associated with a single fixed page.

StoryFragments part markup contains a root <StoryFragments> element. The <StoryFragments> element uses a specified Document Structure namespace.

Objects of Interest in Load Time Optimization

As noted above, any suitable objects can constitute objects of interest for the purpose of load time optimization. In the XPS context, such objects can include, by way of example and not limitation, SolidColorBrush and/or PathGeometry objects.

SolidColorBrush

Brushes are used to paint the interior of the geometric shapes defined by a <Path> element and the characters rendered with a <Glyphs> element. They are also used to define the alpha-transparency mask in the <Canvas.OpacityMask>, <Path.OpacityMask>, and <Glyphs.OpacityMask> property elements.

Brushes are defined relative to a coordinate space. Most brushes (including image brushes, visual brushes, linear gradient brushes, and radial gradient brushes) may specify a coordinate-space transform, in which the Transform property is concatenated with the current effective coordinate space to yield an effective coordinate space local to the brush. For image brushes and visual brushes, the viewport is transformed using the local effective render transform. For linear gradient brushes, the start point and end point are transformed. For radial gradient brushes, the ellipse defined by the center, x radius, y radius, and gradient origin is transformed.

A Solid color brush (SolidColorBrush) fills a region with a solid color. The <SolidColorBrush> element is used to fill defined geometric regions with a solid color. If there is an alpha component of the color, it is combined in a multiplicative way with the corresponding Opacity attribute. Attributes associated with this element for purposes of computing the hash described above include opacity, color space (including channel count), red value (for sRGB or scRGB) and first channel (for all other color spaces).

An example of markup using this element is shown just below:

```
<Path Stroke="#000000">
  <Path.Fill>
    <SolidColorBrush Color="#00FFFF" />
  </Path.Fill>
  <Path.Data>
    <PathGeometry>
      <PathFigure StartPoint="20,20" IsClosed="true">
        <PolyLineSegment Points="250,20 135,150" />
      </PathFigure>
    </PathGeometry>
  </Path.Data>
</Path>
```

PathGeometry

Geometries are used to build visual representations of geometric shapes. The smallest atomic unit in a geometry is a segment. Segments may be lines or curves. One or more segments are combined into a path figure definition. A path figure is a single shape comprised of continuous segments. One or more path figures collectively define an entire path geometry. A path geometry may define the fill algorithm to be used on the component path figures.

A single path geometry may be used in the Data property of the <Path> element to describe its overall geometry. A path geometry may also be used in the Clip property of the <Canvas>, <Path>, or <Glyphs> elements to describe a clipping region.

A <PathGeometry> element constitutes a complete geometry definition. A <PathGeometry> element contains a set of path figures specified either with the Figures attribute or with a child <PathFigure> element. Attributes associated with this element for purposes of computing the hash described above include fill rule, number of segments, and start point.

An example of markup using this element is shown just below:

```
<Path Stroke="#000000">
  <Path.Data>
    <PathGeometry>
      <PathFigure StartPoint="25,75">
        <PolyLineSegment Points="150,75 50,75" />
      </PathFigure>
      <PathFigure StartPoint="50,75" IsClosed="true">
        <ArcSegment
          Size="60,60"
          RotationAngle="0"
```

```
        IsLargeArc="true"
        SweepDirection="Counterclockwise"
        Point="125,75" />
      </PathFigure>
      <PathFigure StartPoint="50,75" IsClosed="true">
        <PolyLineSegment Points="25,25 150,25 125,75" />
      </PathFigure>
    </PathGeometry>
  </Path.Data>
</Path>
```

As noted above, the inventive techniques can be utilized in connection with other objects. Such other objects can include, by way of example and not limitation, matrix transform objects, VisualBrush objects, GradientBrush objects, Image objects, Glyph objects and the like.

Example System

Figure 5:
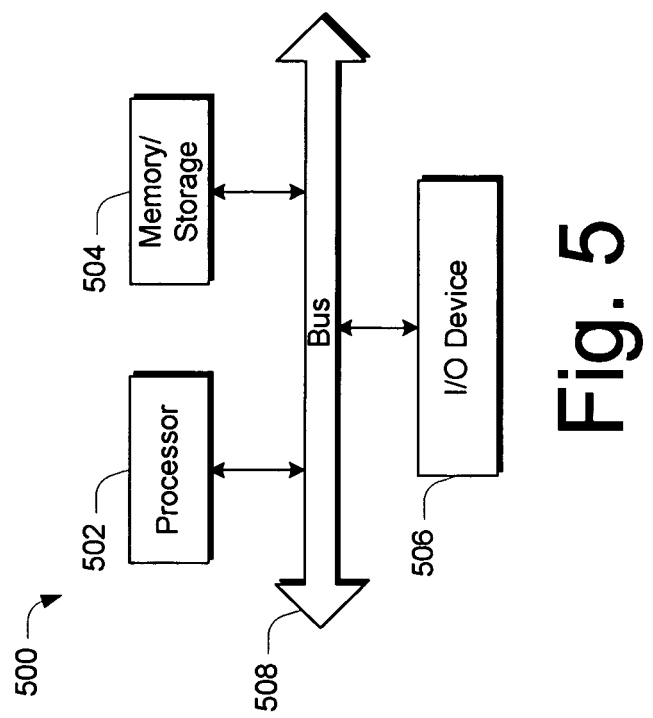
FIG. 5 is a block diagram of an example system that can be utilized to implement one or more embodiments.

FIG. 5 illustrates an example computing device 500 that can implement the various embodiments described above. Computing device 500 can be, for example, computing device 102 of FIG. 1 or any other suitable computing device.

Computing device 500 includes one or more processors or processing units 502, one or more memory and/or storage components 504, one or more input/output (I/O) devices 506, and a bus 508 that allows the various components and devices to communicate with one another. Bus 508 represents one or more of any of several types of bus structures, including a memory bus or memory controller, a peripheral bus, an accelerated graphics port, and a processor or local bus using any of a variety of bus architectures. Bus 508 can include wired and/or wireless buses.

Memory/storage component 504 represents one or more computer storage media. Component 504 can include volatile media (such as random access memory (RAM)) and/or non-volatile media (such as read only memory (ROM), Flash memory, optical disks, magnetic disks, and so forth). Component 504 can include fixed media (e.g., RAM, ROM, a fixed hard drive, etc.) as well as removable media (e.g., a Flash memory drive, a removable hard drive, an optical disk, and so forth).

One or more input/output devices 506 allow a user to enter commands and information to computing device 500, and also allow information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media".

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Conclusion

Various embodiments can be used to process packages or documents that contain markup language describing one or more documents. Markup language descriptions can be processed to identify certain objects that reoccur or are repeated in the markup language description. If a re-occurring or repeating object is encountered in the markup language description, a resource dictionary can be used to catalog such objects and, an associated object model can include, from the resource dictionary, references to a re-occurring or repeating object. By using the resource dictionary as such, memory resources can be conserved when an in-memory representation of the object model is built.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
    one or more computer readable storage media;
    computer-readable instructions on the one or more computer readable storage media which, when executed, provide a load time optimizer configured to:
        in a first pass, catalog certain objects that occur in a markup language description associated with a document in a resource dictionary by setting or incrementing a reference count for the certain objects in the resource dictionary, and insert a resource key associated with each of the objects in an associated object model; and
        in a second pass, determine non-reoccurring objects based on the reference count for the certain objects, remove the non-reoccurring objects from the resource dictionary, and insert an associated object in the object model in place of an associated resource key for the non-reoccurring objects.

2. The system of claim 1, wherein said document conforms to an XML Paper Specification.

3. The system of claim 1, wherein said load time optimizer is configured to build an in-memory representation of the object model.

4. The system of claim 1, wherein the markup language comprises XAML.

5. The system of claim 1, wherein the load time optimizer is configured to identify said certain objects by using a hash associated with said certain objects.

6. A computer-implemented method comprising:
    receiving document markup associated with a document;
    ascertaining, from the document markup, whether an object of interest is encountered in the document markup;
    for objects of interest that are encountered, making an entry in a resource dictionary, and inserting a resource key associated with the objects of interest in an object model associated with the document, the making an entry comprising modifying a reference count, in the resource dictionary, for objects that reoccur in the document markup;
    determining objects that do not reoccur in the document markup based on the reference count;

removing, from the resource dictionary, one or more entries associated with the objects that do not reoccur in the document markup; and inserting an associated object in the object model in place of an associated resource key for the objects that do not reoccur in the document.

7. The method of claim 6, wherein said making comprises inserting a hash value associated with an object of interest.

8. The method of claim 6, wherein said document conforms to an XML Paper Specification.

9. The method of claim 6, wherein said objects of interest comprise SolidColorBrush objects and PathGeometry objects.

10. A system comprising:

one or more computer readable storage media;

computer readable instructions on the one or more computer readable storage media which, when executed, implement a method comprising:

receiving document markup associated with a document, wherein said document conforms to an XML Paper Specification;

ascertaining, from the document markup, whether an object of interest is encountered in the document markup, wherein objects of interest comprise at least a SolidColorBrush object or a PathGeometry object;

for objects of interest that are encountered, making an entry in a resource dictionary, the making an entry comprising modifying a reference count, in the resource dictionary, for objects that reoccur in the document markup;

inserting a resource key associated with objects of interest in an object model associated with the document; and removing, from the resource dictionary, one or more entries associated with objects that do not reoccur in the document markup and, for entries that are removed from the resource dictionary, inserting an associated object in the object model in place of an associated resource key.

11. The system of claim 10, wherein the method further comprises, prior to said removing, ascertaining whether an object reoccurs in the document markup by examining the reference count associated with the object's entry.

12. The system of claim 10, wherein said making comprises inserting a hash value associated with an object of interest.

* * * * *